May 7, 1940.    L. L. CUNNINGHAM    2,199,910
PROPORTIONING CONTROL SYSTEM
Filed March 7, 1930

INVENTOR
LEWIS L. CUNNINGHAM
By Paul, Paul & Moore
ATTORNEYS

Patented May 7, 1940

2,199,910

UNITED STATES PATENT OFFICE 2,199,910

PROPORTIONING CONTROL SYSTEM

Lewis L. Cunningham, Minneapolis, Minn., assignor to Minneapolis-Honeywell Regulator Company, Minneapolis, Minn., a corporation of Delaware Application March 7, 1930, Serial No. 434,115

23 Claims. (Cl. 175—320)

This invention relates to improvements in graduated control system, and has for its general object to provide an electrical system, by means of which power can be transmitted and amplified.

An important object is the provision of electrical means which will transmit and magnify the power and motion of a thermostatic or other equivalent element, and translate this power and motion to cause it to control a second device at any reasonable distance from it.

Objects of the present invention are: to provide means for converting, transposing, and translating the minute substantially forceless motions of a thermostatic or other automatically operable device in a manner to control an adjacent or distant mechanism; to provide an electrically operable power and motion amplifying device adapted for controlling two or more mechanisms, so that by the slight and substantially forceless motion of one mechanism, the controlled mechanism may be operated by a wide range of applied forces through a wide motion range; and to provide a system capable of controlling a burner motor of a heating system by the motion of an adjacent or distant automatically operable device, capable of exerting little force such as a thermostat.

Advantages of the invention will be set forth in the description of the drawing forming a part of this application, and in said drawing.

Figure 1:
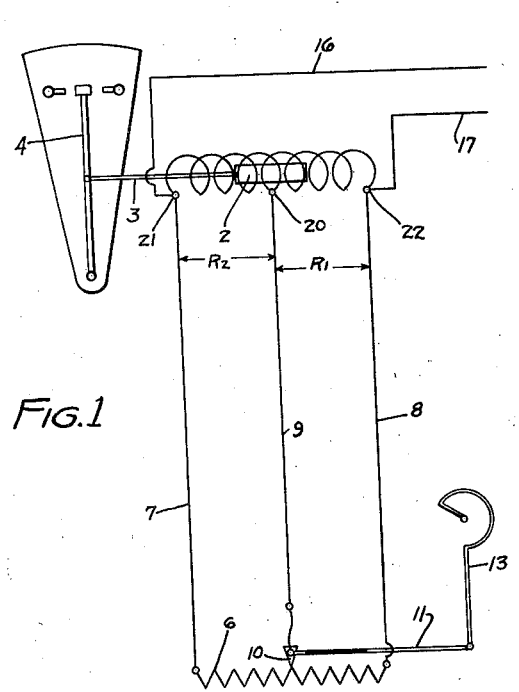
Figure 1 is a diagrammatic view showing the simplest form of the invention.

The simplest form of the invention is shown in Figure 1 in which an electrical system is adapted to transmit the power and motion of one device (a thermostat which can only exert a small force and move through a small distance), to another device, in a manner to apply little or great force for moving a portion of it through distances greater than the distance of motion of the thermostat. This transmission and magnification of force and movement is accomplished by electrical means including a solenoid having a movable core which may be termed inductance means, resistance means, and electrical connections by which variation of the resistance causes inductance variation.

The numeral 1 indicates a solenoid, having a movable core 2. 3 is a connection between the core and some mechanism generally indicated at 4 which is to be controlled. This mechanism, for example, may be a switch which controls the burner motor of a heating system, in which systems this invention finds valuable application. Numeral 6 indicates resistance means, or resistance, which may be given any suitable electrical characteristic. One end of the solenoid is connected by wire 7 with one end of the resistance. The opposite end of the solenoid is connected by wire 8 with the opposite end of the resistance. A tap wire or conductor 9 (in this case a center tap) is attached at one end as at 20 to the solenoid and its opposite end is attached to a suitable slide or contact 10, which may be suitably guided by means not shown, to be moved to vary the resistance 6, which will cause corresponding inductance variation in the solenoid 1. 13 indicates a room thermostat or other automatically movable element responsive to temperature or pressure changes, and this thermostat 13 is connected by means of element 11 with the contact 10 so that motion of the thermostat is transmitted to the contact. By this arrangement, when the center tap is moved by the thermostat, the core of the solenoid is correspondingly moved, if proper power connections such as 16 and 17 are provided. The power connections are respectively attached to the terminals 21 and 22 of the solenoid. One of the advantages of this force and distance magnifying device is that it will operate equally well with direct or alternating current. The device provides a very sensitive control system well adapted for multiplying motion and/or force applied by any automatically operable device particularly one which is capable only of slight motion and which can exert but little force.

The device, as described, has the following advantages: Simplicity of construction and corresponding reduction in cost of manufacture; maximum sensitivity; ability to convert the very feeble force of a control instrument into a tremendously greater force, and apply that force to an instrument to be controlled at any distance from the controlling instrument; ability to control degree of solenoid motion; the operation of the electrical power and motion transmitting device on either alternating or direct current; a minimum sensitivity to voltage variations; amplification ability in regard to degree and force of motion; the requirement of very small force on the part of the control device (control device required only to overcome contact friction); power for moving the controlled mechanism furnished only by the electrical system, and not by the controlling mechanism; and the variation of the resistance by a very mechanically delicate instrument, such as a thermostat.

In this embodiment of the invention, if the thermostat moves to the right, contact 10 will be correspondingly moved, the resistance between line 8 and line 9 will be lowered and the resistance between line 9 and line 7 correspondingly raised. Therefore, more current will tend to flow from the point of connection 20 of the center tap 9 to end 21 of the solenoid coil 1, and the plunger 2 will tend to move to the left since this plunger tends to place itself centrally with respect to that position corresponding to the total resultant magnetism of the solenoid. The reverse action takes place as the thermostat moves in an opposite direction.

Another advantage of the present invention is that the motion at 2 is proportional to the motion at 12 of the thermostat. However, the ratio between the motions and the forces can be varied at will by increasing or reducing the ratio of the number of turns between the coils 1 and 6. A thousand to one multiplication of motion or of power is possible, and is easily accomplished. The length of the resistance 6 can be varied and its electrical characteristics varied, for example the resistance can be shortened proportionately without affecting or changing the length of travel of the plunger 2. The advantage here is that the degree of motion at the thermostat may be very small and yet a large resultant motion at the plunger 2 may be had. In other words, there is a large amount of free amplification.

Figure 2:
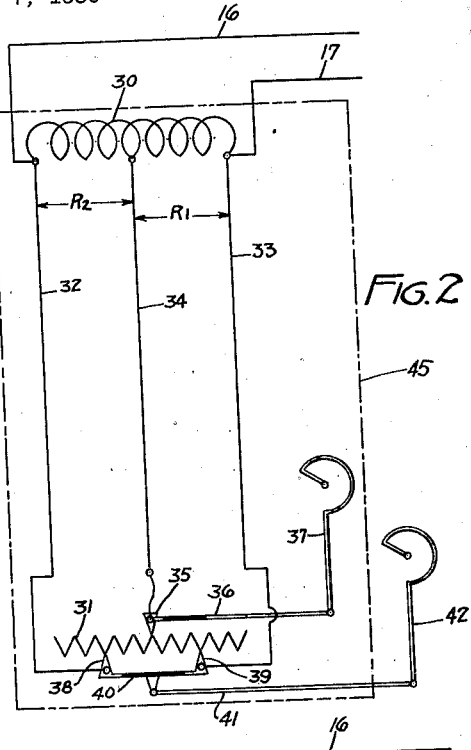
Figure 2 illustrates a modification in which differential adjustment of the resistance is made by means of two thermostatic elements.

A modification is shown in Figure 2 in which the device is made to respond to more than one temperature or pressure or other control device. In this case, the solenoid is indicated at 30. The plunger has not been shown, but it is assumed that in this case the solenoid is operative either electrically or mechanically to control the device symbolically represented at 4 in Figure 1. In this case, the solenoid 30 is controlled by a differential adjustment of the resistance indicated at 31. The center tap wire is indicated at 34 and has the contact 35 adjustable with reference to the resistance 31, this contact being connected by an element 36 with a thermostat 37. Other contacts are adjustable with reference to the resistance 31, in this instance two, indicated at 38—39 and held in fixed or adjustable relation, and movable in unison by the element 40. The contact 38 is connected by wire 32 to one end of the solenoid, and the contact 39 is connected by wire 33 to the opposite end of the solenoid. The line wires are indicated at 16 and 17. Center tap wire 34 connects the solenoid with the contact 35. The mechanical support 40 (which may be an adjustable connector) is connected by element 41 with a second thermostat 42. It will, of course, be understood that the mechanical supports 36, 40 and 41 are suitably insulated. The design should be such that contact 35 is always between contacts 38—39 which contacts in this instance define the resistance range, or in other words, contact 38 should never pass beyond contact 35 when moving in direction toward the thermostats 37—42, and 39 should never pass beyond 35 when moving in a direction away from the control instruments 37—42.

It will be here evident that the distance between the elements 38—39 determine the length of the resistance, while the contact 35 is adapted to vary that particular length of resistance. When the contact 35 is motionless the movement of the contacts 38—39 by the second thermostat will result in a proportional response at the solenoid 30 which will result in a corresponding movement of the core. When both thermostatic elements are active, their movement may be such as to either add or subtract so that the net movement of the plunger is proportional to the net difference or sum of the motions of the two thermostatic elements. The purpose of this arrangement is to cause the device to respond to more than one temperature at a time, and thus obtain differential effects.

The numeral 45 symbolically indicates an enclosure in which the thermostat 37 is placed, it being noted that the thermostat 42 is outside this enclosure, for instance exposed to the temperature outside of a building, while the device 37 may respond to the temperature of a hot water plant or to a boiler temperature or to a heating temperature of any kind, at any point within an enclosure.

A valuable application of this form is for the control of heating apparatuses to raise the temperature of radiators in proportion to the drop in outside temperature so that the temperature difference, between the heating medium and the heated space being controlled, is always proportional to the temperature difference between the space being controlled and the outside temperature.

Figure 3:
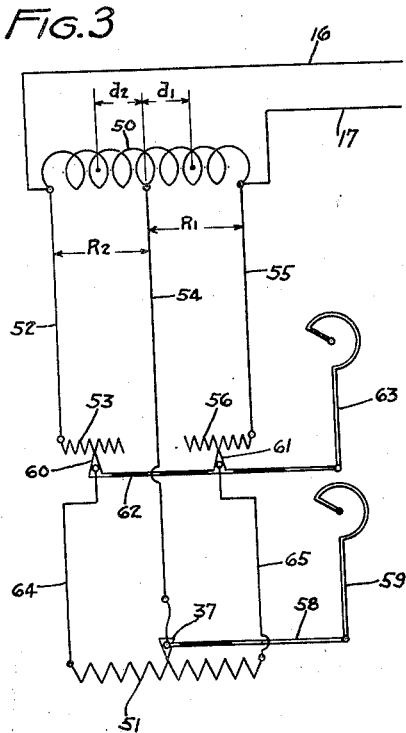
Figure 3 is a view of a modification in which the resistances are in series, and are differentially adjustable.
Figure 4:
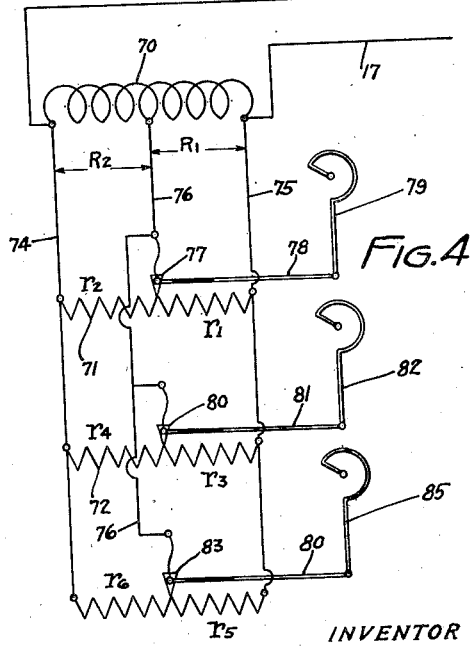
Figure 4 is a modification in which the resistances are arranged in parallel and are differentially adjustable.

In the form of the invention shown in Figure 3, a plurality of resistances are arranged in series. The solenoid, or inductance, is indicated at 50. and one of the resistances at 51. A wire 52 connects one end of the solenoid with a second resistance 53. Sliding contact 60 is arranged to vary the resistance 53, and this sliding contact is connected by conductor 64 with one end of resistance 51. The opposite end of the resistance 51 is connected by a conductor 65 with a sliding contact 61 which cooperates with the resistance 56 in turn connected by wire 55 with the opposite end of the solenoid 50. A center tap wire 54 of the solenoid connects with the sliding contact 57 cooperating with resistance 51 and this contact is connected by suitable means 58 with a thermostat 59. The contacts 60—61 are connected together (preferably adjustably connected) by element 62 for motion in unison, and this element 62 also connects the contacts with thermostat 63. The main line elements are indicated at 16—17. In this device it is apparent that if the total resistance or the combination of resistances on one side, is denoted by the symbol $R_1$ and the combination of the resistances on the other side by symbol $R_2$, then the position taken by the movable core of the solenoid is a function of the ratio of these resistances and it is further clear that $R_1$—$R_2$ may be made up of any number of resistances in series or in parallel. The parallel arrangement is shown in Figure 4 and will be later described in detail. In any event, the position of the core of the solenoid will continue to be a function of the ratio of the total resistance $R_1$ to the total resistance $R_2$. If the distance between the center of the plunger and the center of the right hand section of the solenoid be designated $d_1$ and the corresponding distance on the other side by $d_2$, then $d_1$ plus $d_2$ is the distance from the center of the left hand section to the center of the right hand section. If the resistance $R_1$ is reduced to zero then the limiting value of $d_1$ will be zero because the center of the plunger will then coincide with the center of the left hand section of the coil.

In Figure 4, the inductance is indicated at 70 and resistances respectively at 71, 72 and 73. A conductor 74 connects one end of the inductance 70 with corresponding ends of each of the resistances. Conductor 75 connects the opposite end of the solenoid with corresponding opposite ends of the resistances. 76 indicates a center tap conductor which is connected with sliding contacts 77, 80 and 83 respectively for adjusting resistance of coils 71, 72 and 73. Contact 77 is connected by element 78 with a thermostat 79 or equivalent device. Contact 80 is connected by element 81 with thermostat 82, and contact 83 is connected by element 86 to thermostat 85. In this case the resistances are in parallel, as distinguished from the series relation of Figure 3. In this case the resultant temperature control will be a function of the average values of resistance $R_1$, $R_2$, etc.

It is frequently desirable to have the burner motor of a heating system operate in exact correspondence to the total motion range of a temperature or pressure responsive device such as a thermostat or a fluid control device, or in exact correspondence to any fraction of the total motion range of such a device and therefore in exact mechanical correspondence to any temperature within that range. It is, moreover, desirable to be able to place the thermostatic or corresponding control at any reasonable distance from the motor. It has been attempted heretofore to control the burner motor by means of some mechanical or hydraulic connection, which has been unsatisfactory in many ways. The electrical method now to be described is more dependable, cheaper, and convenient, and particularly convenient because the control device, as before stated, can be placed at any reasonable distance from the motor.

As an example of the use of this invention in controlling heating systems, suppose that a motor is being controlled by means of the element 4, Figure 1, and that we wish the motor to attain full speed when the temperature has risen to 195°, and that the motor is to be stopped when the temperature has reached 205°. Motor operation is, therefore, dependent on a temperature change within a 10° range. Moreover, the control motor may be caused to occupy an indefinitely large number of rotative positions, in either direction in correspondence to any indefinitely large number of positions of the temperature or fluid operable device, within the range set. The result is that the motor can be caused to "float" between its limit positions, in correspondence to the temperature range for which the thermostatic element is set. For example, suppose an embodiment of the invention includes an ordinary room thermostat and a damper controlling motor, assume the temperature is dropping. The motor will begin to operate, if the temperature now remains stationary the motor will stop at an intermediate position. If the temperature continues to drop the motor may be moved step by step until it is finally "full on." If a reversible motor is used, the operation may be reversed at any given point by properly arranging thermostatic contacts. For the purpose of this discussion, the element 4 may be assumed to be a movable switch element alternately engageable with two opposed contacts which control current to an electric motor.

Therefore, the rotation of the motor in any given direction can be made continuous or step by step, and there can be an indefinitely large number of indefinitely small steps so that the motor may occupy any position between the two limits, depending on the temperature or pressure. If the temperature or pressure is outside the prescribed limits, the motor must either be full on or full off, but if the temperature is between these limits the motor "floats" to a position strictly corresponding to the demands of temperature, or pressure.

This invention is particularly valuable for use with certain types of controlling instruments which, as they approach the point at which their effects are to be transferred, their force and degree of motion approaches zero closely. The control instrument may be any delicately balanced instrument such as a weighing scale, for example, wherein it is desirable to have the scale perform some control function at or near its balancing point, and when the force exerted for control must of necessity be very small, in order to avoid the production of a condition of unbalance.

It will be understood that although the solenoid is shown in the drawing as being continuous, it is in fact composed of two separately wound coils having substantially the same electrical characteristics, with corresponding ends electrically connected together, and with the tap wire extending from this connecting point. In other words, we do not have a single solenoid, but two solenoids placed end to end and connected in the manner above mentioned. This device includes in its purposes, the causing of unbalance of resistances or more generally the unbalance of impedances to do useful work.

I claim as my invention:

1. A control system comprising electrically operable means, a switch having a control element operable by said means in a manner to alternatively control two contacts, plural resistance means and electrical connections between the resistance and first means for controlling said first means by variation of resistance, including a conductor and plural means responsive to variations in different physical conditions adapted to control said conductor for differentially varying the resistance of said resistance means.

2. An electric control system comprising a pair of coils having substantially the same electrical characteristics connected in series and having a movable core common to and traversing both, resistance means, a tap wire common to both coils and to the resistance means and adapted for adjustment with respect to the resistance means, conductors respectively connecting corresponding free ends of the coils and resistance means, and plural means automatically responsive to changes in physical conditions and adapted to control the tap wire to differentially adjust the resistance means.

3. A control system comprising electrically operable means, plural resistance means, and electrical connections between the resistance means and the first means to control the first means as the result of variation of resistance means, including a conductor common to first and plural resistance means and adjustable with respect to the resistance means, and plural means responsive to variations in different physical conditions to automatically differentially vary the resistance of said resistance means.

4. In a control system, a solenoid of the center-tap type, resistance means, a plurality of means each separately automatically responsive to changes in a different physical condition, means by which each automatically responsive means can vary the resistance in said resistance means, and electrical bridge connections between the solenoid, resistance means and variation-controlling means.

5. In a control system, a pair of electrically operable devices, a single element responsive to the joint action of said devices, resistance means, a plurality of contacts adjustable with respect to the resistance means, a plurality of members responsive to variations in physical conditions, each of said members controlling at least one of said contacts, and circuits connecting said electrically operable devices, resistance means and contacts, in such manner that the electrically operable devices are controlled to position the single element in accordance with electrical effects which are a function of combinations of variations in the resistance means.

6. In a control system, a solenoid, a single resistance means, a plurality of means each separately automatically responsive to changes in physical conditions, three contacts adjustable with respect to the resistance means, means by which a pair of the contacts which are spaced apart in direction of control motion are controlled by one of the automatically responsive means, and means by which the remaining contact is controlled by another automatically responsive means and electrical bridge connections between the solenoid and resistance in which the resistance is in series with the solenoid, the single contact being adapted to always engage only that portion of the resistance which is intermediate of the spaced pair of contacts.

7. In a control system, a solenoid, resistance means, a plurality of means each separately automatically responsive to changes in physical conditions, three contacts adjustable with respect to the resistance means, means by which two of the contacts are controlled by one of the automatically responsive means, means by which the remaining contact is controlled by another automatically responsive means, and electrical connections between the solenoid and resistance means so arranged that the net electrical effect in the solenoid is a function of combinations of variations in the resistance means.

8. A device of the class described comprising a solenoid, electrical conductors attached to opposite ends of the solenoid, a plurality of resistances in parallel with said conductors, a contact for each resistance movable for varying it, electrical bridge connections including a center tap wire for the solenoid connected with each contact, and means for separately automatically moving each contact in response to changes in physical conditions.

9. A system of the class described comprising, in combination, a pair of electrically operated devices joined electrically in series, a plurality of electrical resistances connected in parallel with said electrically operable devices, a contact for each resistance and movable there-along, connections between said contacts and the junction of said electrically operable devices, a source of electrical power connected to said resistances and electrically operable devices, and means for moving said contacts along their respective resistances.

10. A system of the class described comprising a pair of electrically operable devices joined electrically in series, resistance means, movable contacts controlling said resistance means, means for separately automatically moving said contacts and electrical connections by which the net electrical effect produced by motions of the contacts controls said electrically operable devices, including a connection between one of the contacts and the junction of said electrically operable devices.

11. A system of the class described comprising a pair of electrically operable devices joined electrically in series, resistance means, at least three contacts movable for varying the resistance in said means, means to separately move at least one contact, means to separately move at least two contacts in unison, and electrical connections by which the net electrical effect produced by motions of the contacts controls said electrically operable devices, including a connection between one of the contacts and the junction of said electrically operable devices.

12. In a temperature control device, a thermostat, a pair of similar resistances, a movable contact member engaging each resistance, means operated by the thermostat for simultaneously moving the contacts lengthwise of the respective resistances, and a pair of control circuits each including the effective portion of one of the resistances as determined by the position of the movable contact engaging therewith.

13. In a temperature controlling mechanism, a thermostat, a pair of similar resistances, a movable contact member engaging each resistance, means operated by the thermostat for simultaneously moving the contacts lengthwise of the respective resistances, a three-wire control circuit of which one wire is connected to one end of one resistance, another wire is connected to the opposite end of the other resistance, and the third intermediate wire is connected to the movable contact members, and a controlling mechanism operable by the control circuit.

14. In a temperature control device, the combination of a plurality of control devices each comprising a thermostat responsive to the temperature in a different region, variable resistance controlled by the thermostat, a motor means, and a control circuit for the motor means including the effective resistances of the several control devices.

15. In a temperature control device, the combination of a plurality of control devices each comprising a thermostat responsive to the temperature in a different region, a variable resistance controlled by the thermostat, a motor means, and control circuits for the motor means in which the effective resistances are connected in series.

16. In an electrical control system, a pair of electrically actuated devices, a single element positioned by the joint action of said devices, means for energizing said devices, a plurality of controlling means controlling the relative energization of said devices, each of said controlling means comprising a pair of variable impedances and condition responsive means for simultaneously varying said impedances, the corresponding impedances of said plurality of controlling means forming two sets of impedances, means for connecting the impedances of one of said sets of impedances in series with one of said control devices and means for connecting the impedances of the other of said sets of impedances in series with the other of said control devices.

17. In an electrical control system, a pair of electrically actuated devices, a single element positioned by the joint action of said devices, means for energizing said devices, a plurality of controlling means controlling the relative energization of said devices, each of said controlling means comprising a pair of variable resistances and condition responsive means for simultaneously and oppositely varying said resistances, the corresponding resistances of said plurality of controlling means forming two sets of resistances, means for connecting the resistances of one of said sets of resistances in series with one of said control devices and means for connecting the resistances of the other of said sets of resistances in series with the other of said control devices.

18. A system of the class described, comprising, in combination, a pair of electrically operated devices, means for energizing said devices, and a plurality of controlling means controlling the relative energization of said devices, each of said controlling means comprising a pair of variable resistances and means for simultaneously and oppositely varying said resistances, the corresponding resistances of said plurality of controlling means forming two sets of resistances, means connecting the resistances of one of said sets of resistances in series with each other and in parallel with one of said devices, and means connecting the resistances of the other of said sets of resistances in series with each other and in parallel with the other of said devices.

19. In temperature regulating mechanism the combination of a motor having two controlling circuits; a plurality of resistances connected in series for each circuit; a plurality of thermostats; and means associated with each thermostat for simultaneously cutting resistance into one of the circuits and cutting resistance out of the other circuit.

20. In a temperature control device for controlling a temperature changing means, the combination of a plurality of control devices each including a thermostat responsive to the temperature in a different region and a variable resistance controlled by the thermostat, one of said thermostats being responsive to a temperature condition of said temperature changing means, a motor means operatively associated with said temperature changing means, and a control circuit for the motor means including the effective resistances of the several control devices.

21. In a temperature control device for controlling a temperature changing means within an enclosure, the combination of a plurality of control devices each including a thermostat responsive to the temperature in a different region and a variable resistance controlled by the thermostat, one of said thermostats being responsive to a temperature condition of said temperature changing means and another of said thermostats being responsive to the temperature outside of said enclosure, a motor means operatively associated with said temperature changing means, and a control circuit for the motor means including the effective resistances of the several control devices.

22. In a temperature control device for controlling a temperature changing means for a building, the combination of a plurality of control devices each including a resistance variable in accordance with the temperature of a fluid medium in a different region, one of said resistances being responsive to a fluid temperature condition of said temperature changing means, a source of power connected to said resistances to maintain a continuous current flow therethrough, a motor means operatively associated with said temperature changing means, and a control circuit for the motor means including the effective resistances of the several control devices.

23. In a temperature control device for controlling a temperature changing means for a building, the combination of a plurality of control devices each including a resistance variable in accordance with the temperature of a fluid medium in a different region, one of said resistances being responsive to a fluid temperature condition of said temperature changing means and another of said thermostats being responsive to the temperature of the air outside of said building, a source of power connected to said resistances to maintain a continuous current flow therethrough, a motor means operatively associated with said temperature changing means, and a control circuit for the motor means including the effective resistances of the several control devices.

LEWIS L. CUNNINGHAM.